April 12, 1955  M. D. STEPATH ET AL  2,706,236
CUTTING AND GOUGING ELECTRODE HOLDER AND METHOD
Original Filed April 11, 1949  2 Sheets-Sheet 1
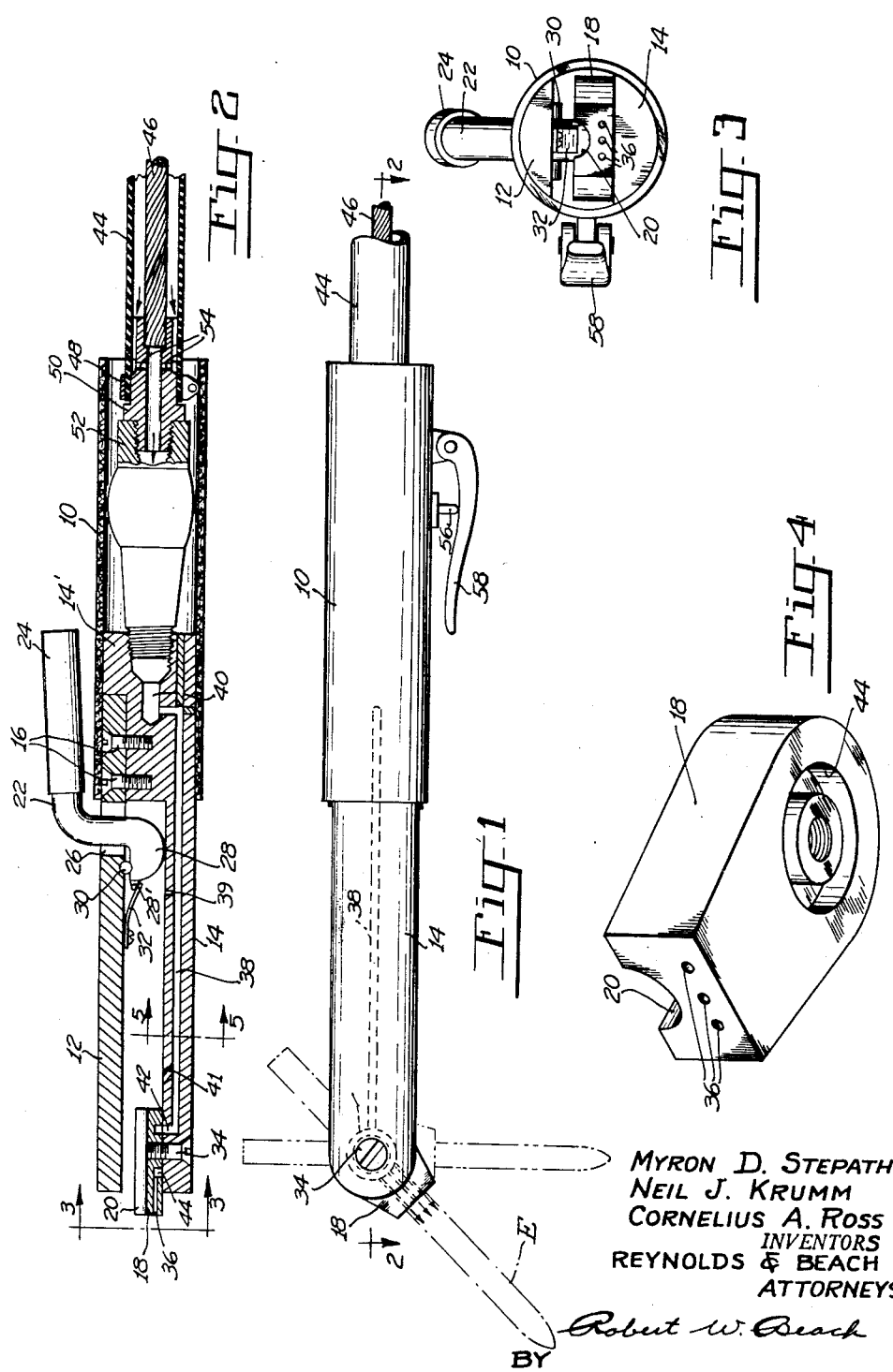
MYRON D. STEPATH
NEIL J. KRUMM
CORNELIUS A. ROSS
INVENTORS
REYNOLDS & BEACH
ATTORNEYS
BY Robert W. Beach April 12, 1955   M. D. STEPATH ET AL   2,706,236
CUTTING AND GOUGING ELECTRODE HOLDER AND METHOD
Original Filed April 11, 1949   2 Sheets-Sheet 2
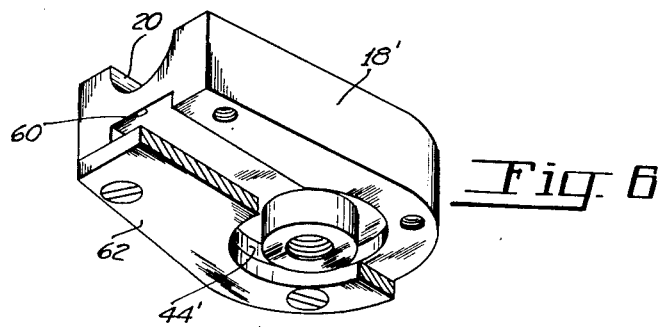
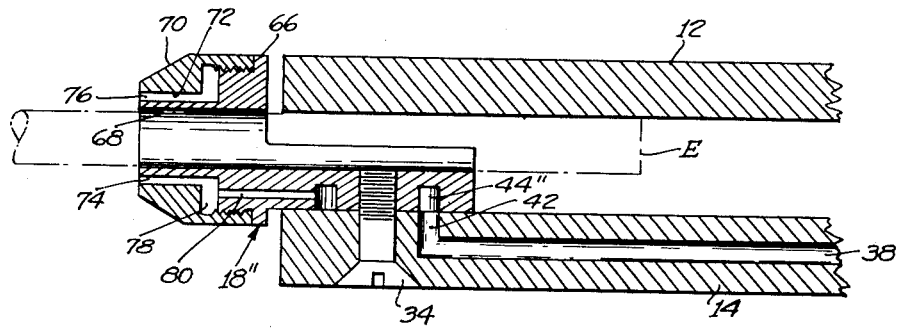
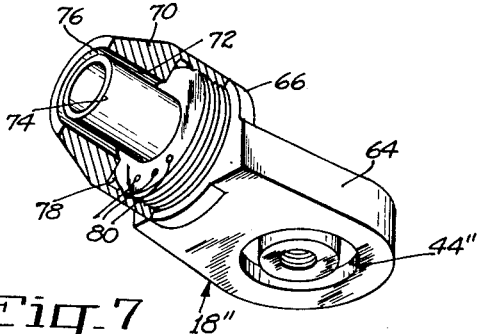
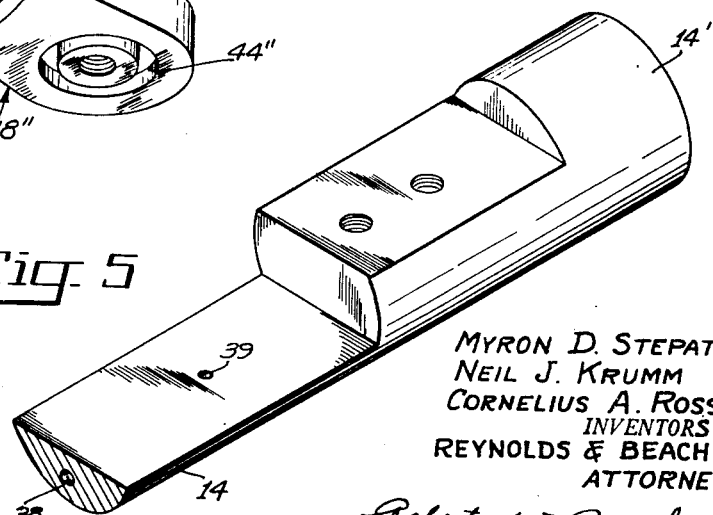
MYRON D. STEPATH
NEIL J. KRUMM
CORNELIUS A. ROSS
INVENTORS
REYNOLDS & BEACH
ATTORNEYS
BY Robert W. Beach

# United States Patent Office 2,706,236
Patented Apr. 12, 1955

2,706,236

CUTTING AND GOUGING ELECTRODE HOLDER AND METHOD

Myron D. Stepath, Lancaster, Ohio, and Neil J. Krumm, Bremerton, and Cornelius A. Ross, near Bremerton, Wash., assignors to Arcair Company, Bremerton, Wash., a partnership Continuation of application Serial No. 86,746, April 11, 1949. This application November 27, 1953, Serial No. 394,610

13 Claims. (Cl. 219—15)

This invention relates to an electrode holder for electric arc-gas jet cutting and gouging torches, and more particularly concerns an improved electrode holder permitting angular adjustment of the electrode held therein while maintaining a predetermined relationship between the electric arc and the gas stream impingement on the work for forcibly removing molten metal from the work in substantially uniform manner throughout consumption of the electrode. The invention further relates to a novel method for cutting and gouging metal which advantageously utilizes the improved electrode holder. The invention is herein illustratively described by reference to the preferred form and practice thereof; however, it will be understood that certain changes and modifications therein could be made without departing from the essential features involved.

The present patent application is a continuation of our application Serial No. 86,746, filed April 11, 1949.

An important object of the present invention is a method for cutting and gouging of metal rapidly and efficiently by use of ordinary solid-rod electrodes. A related object is such a method which may be carried out with simple and inexpensive equipment and at low overall cost, including the cost of labor, electric current and compressed gas. Still another object is to accomplish these results by a method which enables the achievement of very uniform cutting and gouging during the entire consumption of a considerable length of electrode projecting from the holder without use of automatic electrode feed or other complex mechanism formerly considered necessary in achieving these results, such results being accomplished by using in novel manner the combined effects of an electric arc and a force stream of gas.

Another object of the invention is an electrode holder embodying a gas jet nozzle in direct association with an electrode clamp, capable of implementing the foregoing method, and so formed that the gas jet will be spaced somewhat from while being directed close alongside the electrode and constantly oriented substantially parallel to the axis thereof irrespective of the length of the electrode and of the angular relationship of the electrode to the handle of the device. Preferably such a gas jet nozzle is formed as an integral part of a grooved electrode clamp jaw.

In its method aspect the invention is based on the following original discovery. Consider an ordinary solid-rod electrode to be gripped near one end in an electric torch holder so as to project freely toward the work with the surface of its remaining or projecting length completely exposed to permit substantially complete consumption of the electrode without shifting the grip thereon. Assume, then, that the projecting end of the electrode gripped in this manner is placed adjacent the work and an arc is struck, which arc is advanced progressively along a desired cutting or gouging line on the work, so as to heat and melt the metal. It will be evident that as this action takes place, the electrode is progressively consumed due to combined mechanical and chemical effects of the arc, and the distance separating the location at which the electrode is gripped from its projecting or arc end progressively decreases from its original value to a very small value or substantially zero. It has been discovered that the molten metal heated by the arc under these conditions may be forcibly removed from the work in highly uniform manner (i. e. as to depth and width of the resulting cut or groove) and without formation of appreciable slag by a very simple technique utilizing a high-velocity stream of gas. This is accomplished by directing a free stream of gas of substantially constant high velocity close alongside the exteriorly exposed surface of the electrode and parallel to the axis of the electrode, toward the work, and from the location at which the electrode is gripped. It was found, contrary to logical expectation, that when this free stream of gas, such as merely compressed air, is ejected along the projecting electrode in this manner at a sufficiently high velocity the force and effect of the gas in removing the molten metal from the work under the arc remains substantially constant despite the progressive consumption of the electrode which varies the distance between its projecting end, that is, the location of the arc, and the point at which the electrode is gripped, which is the location from which the jet stream is directed. In other words, it is found that an entire electrode or a large fraction thereof may be progressively consumed in this manner to do useful cutting and gouging work without any necessity for changing the grip on the electrode, and furthermore, without any necessity for changing the conditions under which the stream of gas is ejected toward the work.

If the stream velocity is high enough the rate at which molten metal is forcibly ejected thereby from the work under the arc is approximately constant despite the fact that the distance of the gas jet nozzle from the work may vary by as much as several hundred percent in the course of consuming an ordinary solid-rod electrode. The important advantage derived from this discovery is that ordinary solid-rod electrodes may be used, any kind of compressed gas chemically compatible to the work may be used, and the method is very rapid since once the electrode is gripped near one end, for instance, its projecting length may be fully consumed without pausing to regrip.

Of course, if the gas used is compressed air or oxygen, a certain amount of oxidation of the molten metal may take place during its removal from the work by force. However, the primary action is an action of force and any oxidation is incidental. If the gas used is of the inert type, then the amount of oxidation taking place will be negligible, but the forcible ejection of molten metal nevertheless will remain substantially the same in either case. Since the type of gas used is not of great importance to the present method, it is obvious that the choice will depend upon economic considerations and for that reason obviously compressed air is usually preferred.

It will also be readily evident that the cost of practicing the discovered method is low when compared with prior methods utilizing special tubular or composite tubular electrodes designed to carry gas to the work through their interiors. The same is true of those former methods utilizing complex automatic electrode or gas nozzle feed mechanisms in order to maintain a substantially constant physical relationship or spacing between the electric arc and the gas jet nozzle. Moreover, the present method is highly versatile in that it utilizes portable compact torch equipment enabling work to be done on inverted surfaces, under cramped space conditions, etc. The present invention is not to be compared, of course, with prior methods merely for welding, in which a blanketing stream of inert gas having low velocity is ejected over the heated area of the work in order to minimize oxidation of the welded areas. Likewise, the present method is readily distinguished from and constitutes an important improvement over prior proposals for cutting or gouging metals in which it was considered necessary to permit only a short portion of an electrode to project from the holder and to make frequent or continuous feed adjustments of the electrode in order to maintain a sufficient length thereof exposed to the work for consumption under effects of the arc. The necessity in such prior practice of frequently pausing to manipulate an incremental electrode feed element resulted in great loss of time and slow work. It was not heretofore appreciated nor conceived that uniform cutting or gouging action was achievable so as to permit complete electrode consumption without regripping, if the gas jet were directed as described from a distance from the work which corresponded to the greatly variable projecting length of the electrode.

In its apparatus aspects the invention is further aimed at achieving an electrode holder in which the angle between the electrode and the axis of the handle can be adjusted easily and quickly by pivoting of an electrode clamp jaw or chuck. Preferably, and as herein illustrated, the electrode is pivoted in the holder by resilient clamp action. Moreover, in any of its adjusted positions an electrode gripped in the holder is readily released for removal by simple operations of a convenient clamp separator.

These and other features, objects and advantages of our invention will become more fully evident from the following detailed description based upon the accompanying drawings illustrating preferred forms of the improved electrode holder.

Figure 1 is a side view of one form of the electrode holder, illustrating by broken lines different adjusted positions of an electrode held by it.

Figure 2 is a longitudinal section of the same, taken on line 2—2 in Figure 1, with the electrode clamp jaw co-oriented with the axis of the handle.

Figure 3 is an end view of the same, viewed from line 3—3 in Figure 2.

Figure 4 is a bottom perspective view at an expanded scale of the combined electrode clamp jaw and jet nozzle employed in the illustrated electrode holder.

Figure 5 is a top perspective view of the core piece which forms the clamp arm carrying the clamp jaw, the tip of this arm element being broken away along line 5—5 in Figure 2 to reveal the location of the gas passage therein leading to the nozzle.

Figure 6 is a bottom perspective view corresponding to Figure 4, of a modified type of combined electrode clamp jaw and jet nozzle, part of which is broken away to reveal interior details, and which is useful in the same basic type of electrode holder construction illustrated in Figure 1.

Figure 7 is a bottom perspective view corresponding to Figure 4, of still a different form of combined electrode clamp jaw and jet nozzle, with parts broken away to reveal interior details, and which is similarly applicable to the illustrated basic electrode holder construction.

Figure 8 is a longitudinal sectional view corresponding to Figure 2, of the tip or electrode end of the electrode holder, embodying the combined nozzle and clamp jaw shown in Figure 7.

As shown in Figures 1 to 3, the basic electrode holder construction includes a hollow cylindrical handle 10 of suitable insulating material, such as fiber, and a coacting pair of arm members 12 and 14 projecting endwise from the handle in generally parallel spaced relation. The arm 14 has a cylindrical base 14' (Figures 2 and 5) press-fitted within the bore of handle 10. One side of this base is flattened and the base end of the other arm 12 attached to it by a pair of machine screws 16. The screw heads are countersunk and the exterior wall at the base of arm 12 is rounded to the contour of the cylindrical base 14', to be accommodated within the end of the handle. These arms, preferably of copper or other conductive metal having resilient properties, then serve as the jaws or arms of a spring clamp.

At its projecting end at least one of the arms, such as arm 14, carries an electrode clamp jaw 18 (Figure 4) cooperating with the other arm 12 to grip and hold an electrode. The side of the jaw facing the arm 12 is grooved longitudinally. An electrode E (Figure 1), laid on its side in this groove, is held in the jaw by resilient closing action of the clamp arms 12 and 14. It may be released for longitudinal adjustment or replacement by separating the arms against their resilient force, through action of a cam lever 22. The cam lever comprises a lever handle 24 lying alongside the handle 10, and a neck extending at right angles thereto through a slot 26 in arm 12, into the space between such arms, terminating in a tip directed substantially parallel to the handle. Within this space the cam lever tip has on one side a cam portion 28 engageable with arm 14, and its other side is notched for pivoting upon a transverse pin 30 or convexity carried by arm 12 and projecting from its inner surface to form a fulcrum. The cam lever is designed to spread the arms 12, 14 by pressing the lever handle 24 toward the side of the electrode holder handle 10. A leaf spring 32 presses against an ear 28' on the inner end of the cam lever, to keep the handle from swinging outward when in jaw-clamped position, although it may be removed by being swung outward and the lever tip then drawn through the slot 26 to disengage the cooperating semicylindrical surfaces of pin 30 and the notched cam portion 28.

An electrode gripped resiliently between the flattened inner face of arm 12 near its tip end, and the groove base in clamp jaw 20, may be swung into various angles of adjustment relative to the common axis of the holder clamp and handle, by pivoting of the jaw 18 about the axis of a screw 34 securing the jaw pivotally to, and upon the inner face of, arm 14. In Figure 1 the clamp jaw 20 appears in solid lines, positioned with its longitudinal axis, corresponding to the electrode axis, approximately at 45 degrees to the general axis of the electrode holder, and in broken lines at right angles thereto. The electrode is free to swing with the clamp jaw into innumerable positions of adjustment, through a wide angle approaching 360 degrees, as the space between the arms 12 and 14 is open at the sides. If desired, screw 34, or an equivalent pivotal connection for the clamp jaw, may be of the friction type which holds the swivel jaw to the arm tip with a constant degree of firmness and prevents involuntary swinging of the electrode out of any particular adjusted position, and yet permits changing its angular position at will, requiring the use of no tools to release and set the jaw screw each time an adjustment is made.

The construction of the clamp jaw 18 is of particular importance for the further reason that it embodies or constitutes in itself a gas jet nozzle having one or more end-opening orifices 36 directed close alongside and generally parallel to the side of an electrode held by the jaws, yet spaced slightly from the electrode. Gas under pressure fed to these orifices is ejected in a stream alongside the electrode, to blow molten metal from the work heated beneath the electric arc. By having these orifices directed parallel to the electrode instead of at an angle to it, the force and effect of the stream of gas acting upon the work is substantially constant. This is true irrespective of variations in the distance from the orifice end of the nozzle to the work, resulting from natural variations in electrode length, as one is eroded progressively away and replaced by another and longer electrode. Consequently, among other advantages, such as that mentioned at the outset, with an electrode-parallel jet it is unnecessary to the effective operation of the gas jet to adjust the jet's direction relative to the electrode or to make longitudinal adjustment of the electrode in the holder, in compensation for electrode dimensional changes through wear.

It will appear from the foregoing, therefore, that the apparatus is admirably suited for practicing the described novel method. This is true since it permits of angular adjustment of the electrode and of the gas jet nozzle means simultaneously simply by rotating the electrode about the axis defined by the machine screw 34. This adjustment may be made to suit the operator's convenience, depending upon the type and positional attitude of the work being gouged or cut.

It is to be noted that the cutting or gouging action achieved by the method will be substantially constant by producing a high-velocity stream of gas through the jet nozzles. The pressure of gas required to produce the necessary work displacement force will vary somewhat with the specific apparatus, i. e. nozzle area, etc., but ordinarily the pressure of compressed air found in industrial establishments will be sufficient for the purpose with nozzles and connecting ducts of adequate size.

In the form of clamp jaw nozzle shown in Figures 2 to 4, inclusive, the orifices are three in number, arranged in a straight line and operable to direct a composite stream of gas alongside and parallel to the electrode, more or less in the form of a solid sheet by merging of the individual streams at a distance from the nozzle.

Gas is led to the nozzle via a longitudinal passage 38 in arm 14, communicating between a central axial port opening 40 in the cylindrical base of such arm, and an opposite port opening 42 in the tip end of the arm. The opening 42 is an effective element of a sealed rotary gas passage coupling between the arm and the nozzle 18. Cooperating with this port opening is an annular duct 44 formed by a groove concentric with the axis of screw 34, in that side of the jaw 18 which contacts the inner side of the arm. The orifice passages 36 communicate with this annular duct. Since the nozzle is held tightly against the adjoining face of the arm by screw 34, a substantially sealed connection is formed at the interface between the nozzle and the arm, which is sufficiently pressure-tight in each of the various possible angularly adjusted positions of the nozzle as to prevent any appreciable wastage of gas.

Gas is bled from passage 38 through an opening 39 to cool spring 32 so that it will retain its temper, and through an inclined opening 41 to cool the jaw 18. Gas is delivered to the electrode holder via a flexible conduit 44 of insulating material which encases the conductor 46 interconnecting the electrode holder electrically with the source of current employed in conjunction with it. This conduit may be of rubber, and it forms an annular gas passage surrounding the conductor 46. Its electrode-holder end receives and is clamped by a band 48 to the outer end of a centrally bored fitting 50 which threads into the end of a gas valve housing 52, as shown in Figure 2. The valve housing in turn is received within the base end of the hollow handle 10, and is threaded at its opposite end into the end of the cylindrical clamp base 14', in communication with port opening 40. Suitable openings 54 are provided in the fitting 50 for passage of the gas from the annular gas passage within conduit 44 to the central bore of such fitting. The valve has an actuating plunger 56 projecting externally of the handle 10 through a suitable aperture therein, which is actuated by a lever 58 disposed conveniently alongside the handle for manipulation to turn on and off the flow of gas to the nozzle 18 at will at the same time the handle 10 is grasped.

The modified combination electrode clamp jaw and gas nozzle 18' illustrated in Figure 6 is generally similar to that shown in Figure 4, with respect to its outside configuration and the manner in which it engages and holds the electrode cooperatively with the opposite clamp arm 12 of the electrode holder. The variation lies primarily in the nature of the nozzle orifice 60, which in this case is a slot of elongated rectangular cross section. This nozzle orifice may be formed by milling or casting a shallow groove in that side of the clamp jaw to be located adjacent to the arm 14, and, by use of countersunk screws, securing a cover plate 62 over its grooved face, to form the fourth wall of an orifice passage defined by such groove. The slot communicates directly with the annular duct 44', as before, and the plate 62 has an aperture registering with the peripheral wall of the duct 44', to extend such wall. This two-part assemblage is then secured pivotally to the tip of the arm 14 (Figure 2), receives gas and is adjusted, all precisely in the same way as the jaw 18.

An orifice 60 of rectangular cross section, as employed in this second-illustrated form of combined swivel electrode clamp jaw and nozzle, may be preferred to the single or multiple-orifice form previously described both for reasons of construction and also in cases wherein the gas jet projected by the orifice is required to be formed more nearly as a directive sheet stream flowing parallel to and alongside the electrode toward the work.

Still another modified form of combined clamp jaw and jet nozzle element, useful in the same basic holder construction of Figures 1 to 3, appears in Figures 7 and 8, wherein such element 18" has a body portion 64 generally similar in form to the clamp jaw 18 appearing in Figure 4, but with a nozzle extension portion 66 of annular form. An electrode E, held in the groove of the jaw, must also pass through a chuck having a central bore 68 in the nozzle extension 66, as shown in Figure 8. The nozzle is completed by an external ring 70 having threaded connection to the inner or base end of the extension 66. This ring has an inner annular wall 72, between which and the outer annular wall 74 of a thin axial projection of the extension portion 66, is defined an end-opening annular orifice passage 76. The inner end of this orifice passage terminates in an enclosed annular duct 78. Between this duct and the annular duct 44", comprising an element of the rotary joint passage connection between the clamp jaw and arm tip, extends a plurality of axial gas passages 80 (Figure 7).

With this annular type of nozzle chuck the stream of gas ejected by the nozzle orifice entirely surrounds the electrode, thereby affording distribution of the gas over an increased area of the work around the electrode. If the gas used is of an inert type the result of its passage through this type of nozzle, will be to retard oxidation of the metal, but the operation of our device is to be distinguished from certain types of welding employing an inert gas blanket, by the high velocity of our gas jet required to produce the desired ejection of the molten metal necessary for an effective cutting or gouging operation.

It is to be noted that the nozzle extension 66 in no way interferes with adjustments in angular position of the combined electrode chuck and nozzle, since the ends of the arms 12 and 14 are rounded along a circular arc concentric with the pivot axis of the chuck (Figure 1). In addition, reception of the electrode in the chuck of the nozzle extension 66 serves to provide a more positive hold upon the electrode, gripped by clamp action of the arms 12 and 14.

We claim as our invention:

1. An electrode holder for electric arc apparatus, comprising a handle portion, clamp means carried by and projecting from said handle portion, and operable to grip and hold an electrode in operative position relative to said handle portion, said clamp means comprising an elongated member and an electrode-gripping element mounted pivotally on said elongated member to adjust the angle between the electrode's axis and the handle's axis by pivoting of said element, said electrode-gripping element comprising gas nozzle means having therein an orifice directed outward alongside said electrode and substantially parallel to its axis in each of various adjusted angular positions thereof, and gas conduit means extending to said nozzle means to deliver gas thereto for ejection under pressure through said orifice in each of said various adjusted angular positions of said electrode-gripping element and nozzle.

2. The electrode holder defined in claim 1, wherein the projecting clamp means additionally comprises an arm projecting from the handle portion in generally parallel spaced relation to the elongated member and urged resiliently towards such member, and the side of the electrode-gripping element facing said arm is grooved lengthwise and generally at right angles to its pivot axis, to receive and support an elongated electrode pressed firmly against the base of the groove by said resiliently urged arm, to grip such electrode securely therebetween.

3. An electrode holder comprising an elongated handle portion, a pair of resiliently urged arm members projecting in generally parallel spaced relation endwise from said handle portion, and an electrode clamp jaw pivotally mounted on the inside face of one arm member opposed to the opposite arm member, near its projecting end, for pivoting about a transverse axis normal to such face, said clamp jaw cooperating with the other arm member to grip and hold an electrode therebetween throughout various pivotally adjusted positions thereof to vary the angle between the electrode and handle's axis, said clamp jaw comprising a gas nozzle having an orifice directed outward parallel with the electrode-engaging surface of said clamp jaw but spaced slightly therefrom, said clamp jaw and adjacent arm member cooperatively forming a gas conduit rotary joint connection for said nozzle, comprising an annular duct formed in one such member concentric with the jaw's pivot axis, and a port formed in the other such member and communicating with the duct, at their interface, and a gas supply connected to the handle, such arm member having an internal longitudinal bore therein communicating between said rotary joint connection and said gas supply.

4. An electrode holder comprising a handle portion, a coacting pair of clamp arm members, one carrying an electrode clamp jaw, the other having an opposing generally flat electrode-engaging inner face, both such arm members projecting in generally parallel spaced relation from said handle, and being resiliently urged relatively together to grip and hold securely an electrode between the other of said arm members and said clamp jaw, means interacting between said arm members and operable to urge them apart against such resilient force to release and receive an electrode, means pivotally connecting said electrode clamp jaw to its supporting arm member, for swinging thereof about an axis disposed generally parallel to the plane which contains the longitudinal axes of said arm members, such axis being also disposed generally perpendicular to the longitudinal axes of such arm members, for angular adjustment of an electrode engaged by said jaw, relative to the axis of said handle portion, said electrode clamp jaw constituting a gas nozzle having an end-opening orifice directed perpendicular to the pivot axis of said clamp jaw, and gas conduit means including a rotary joint connection through the clamp-jaw-carrying arm, including an annular duct encircling the pivot axis of the clamp jaw.

5. The electrode holder defined in claim 4, wherein the orifice is elongated and substantially rectilinear in cross section, the long dimension being generally parallel to the plane of swing of the electrode, such orifice being operable to direct a sheet-stream of gas along and parallel to one side of the electrode when gas under pressure is delivered thereto through the rotary joint connection.

6. An electrode holder comprising a handle portion, a coacting pair of clamp arm members, one carrying an electrode clamp jaw, the other having an opposing generally flat electrode-engaging inner face, both such arm members projecting in generally parallel spaced relation from said handle, and being resiliently urged relatively together to grip and hold securely an electrode between the other of said arm members and said clamp jaw, means interacting between said arm members and operable to urge them apart against such resilient force to release and receive an electrode, means pivotally connecting said electrode clamp jaw to its supporting arm member, for swinging thereof about an axis disposed generally parallel to the plane which contains the longitudinal axes of said arm members, such axis being also disposed generally perpendicular to the longitudinal axes of such arm members, for angular adjustment of an electrode engaged by said jaw, relative to the axis of said handle portion, said electrode clamp jaw having an electrode receiving groove in the inner face thereof and constituting a gas nozzle having an end-opening orifice directed perpendicular to the pivot axis of said clamp jaw, and parallel to its groove, and gas conduit means including a rotary joint connection through the clamp-jaw-carrying arm, including an annular duct encircling the pivot axis of the clamp jaw.

7. An electrode holder comprising a handle portion, a coacting pair of clamp arm members, one carrying an electrode clamp jaw, the other having an opposing generally flat electrode-engaging inner face, both such arm members projecting in generally parallel spaced relation from said handle, and being resiliently urged relatively together to grip and hold securely an electrode between the other of said arm members and said clamp jaw, means interacting between said arm members and operable to urge them apart against such resilient force to release and receive an electrode, means pivotally connecting said electrode clamp jaw to its supporting arm member, for swinging thereof about an axis disposed generally parallel to the plane which contains the longitudinal axes of said arm members, such axis being also disposed generally perpendicular to the longitudinal axes of such arm members, for angular adjustment of an electrode engaged by said jaw, relative to the axis of said handle portion, said clamp jaw constituting a gas nozzle comprising a generally flat, grooved portion disposed for pivoting between the arm members, and an annular nozzle extension portion with a central bore aligned with the groove to pass an electrode laid in such groove, the nozzle orifice being of annular cross section, surrounding said bore, to direct a sheath of gas axially, surrounding the electrode, the annular extension portion projecting beyond and clearing the ends of the arm members for swinging of the clamp jaw and nozzle about its pivot axis.

8. An electrode holder comprising a handle portion, a coacting pair of clamp arm members, one carrying an electrode clamp jaw, the other having an opposing generally flat electrode-engaging inner face, both such arm members projecting in generally parallel spaced relation from said handle, and being resiliently urged relatively together to grip and hold securely an electrode between the other of said arm members and said clamp jaw, means interacting between said arm members and operable to urge them apart against such resilient force to release and receive an electrode, means pivotally connecting said electrode clamp jaw to its supporting arm member, for swinging thereof about an axis disposed generally parallel to the plane which contains the longitudinal axes of said arm members, such axis being also disposed generally perpendicular to the longitudinal axes of such arm members, for angular adjustment of an electrode engaged by said jaw, relative to the axis of said handle portion, said electrode clamp jaw constituting a gas nozzle having a row of end-opening orifices arranged substantially in a straight line, directed generally parallel to each other and substantially parallel to the electrode-engaging surface of the clamp jaw but spaced from such surface, and gas conduit means including a rotary joint connection through the jaw-carrying-arm adjacent to the pivot axis of the clamp jaw.

9. The method of gouging metal by use of a consummable solid rod electrode, comprising gripping an elongated solid rod consummable electrode with a portion of its length projecting freely toward the work and with the surface of said portion exposed, heating and melting the portion of the work to be gouged by striking and maintaining an arc between the projecting end of such electrode and the work and causing consumption of said portion of the electrode progressively while maintaining said grip on the electrode, and continuously with such heating and melting of the work forcibly blowing the melted metal from the work heated beneath the arc by directing a free stream of air along one side of the exposed surface of said portion of the electrode and substantially parallel to the axis of the electrode so said stream passes between the electrode and the work, the force of said high velocity stream of air being sufficiently high to effectively remove the melted metal from beneath the arc and effect a uniform gouging action as said portion of the electrode is consumed.

10. The method of gouging metal as defined in claim 9 wherein the stream of air is directed toward the work from the location at which the electrode is gripped.

11. The method of gouging metal by use of a consummable solid rod electrode, comprising gripping an elongated solid rod consummable electrode with a portion of its length projecting freely toward the work and with the surface of said portion exposed, heating and melting the portion of the work to be gouged by striking and maintaining an arc between the projecting end of such electrode and the work and causing consumption of said portion of the electrode progressively while maintaining said grip on the electrode, and continuously with such heating and melting of the work forcibly blowing the melted metal from the work heated beneath the arc by directing a free stream of gas solely along one side of the exposed surface of said portion of the electrode substantially parallel to the axis of the electrode so said stream passes between the electrode and the work, the force of said high velocity stream of gas being sufficiently high to effectively remove the melted metal from beneath the arc and effect a uniform gouging action as said portion of the electrode is consumed.

12. The method of gouging metal as defined in claim 11 wherein the free stream of gas is directed toward the work from the location at which the electrode is gripped.

13. An electrode holder for electric arc gouging apparatus comprising a handle portion, clamp means carried by and projecting from said handle portion and operable to grip and hold an electrode in operative position with its longitudinal axis angularly disposed relative to the longitudinal axis of said handle portion so an arc may be struck between the tip of such electrode and work beneath it, compressed air nozzle means having therein an orifice opening adjacent said clamp means and disposed solely in a plane laterally offset from the plane of said axes for directing a high velocity stream of air along one side and substantially parallel to the axis of the electrode to pass between the tip of the electrode and the work and forcibly blow melted metal from beneath the arc to effect a uniform gouging action.

References Cited in the file of this patent

UNITED STATES PATENTS

| Number | Name | Date |
|---|---|---|
| 1,324,337 | Chapman | Dec. 9, 1919 |
| 1,746,208 | Alexander | Feb. 4, 1930 |
| 1,917,109 | Frost | July 4, 1933 |
| 2,510,960 | Danhier | June 13, 1950 |
| 2,524,233 | Giroux | Oct. 3, 1950 |

FOREIGN PATENTS

| Number | Country | Date |
|---|---|---|
| 618,603 | France | Dec. 20, 1926 |